Patented Nov. 26, 1929

1,737,272

UNITED STATES PATENT OFFICE

WALTER SCHOELLER, OF BERLIN-CHARLOTTENBURG, HANS JORDAN, OF BERLIN-STEGLITZ, AND REINHARD CLERC, OF BERLIN, GERMANY, ASSIGNORS TO SCHERING-KAHLBAUM A.-G., OF BERLIN, GERMANY

PRODUCTION OF MENTHOL

No Drawing. Application filed June 29, 1928, Serial No. 289,325, and in Germany July 15, 1927.

Our invention refers to the production of menthol.

As it is shown in the applications for patent of the United States, Serial No. 200,289, filed by Hans Jordan June 20, 1927, and Serial No. 287,639 filed by Walter Schoeller, Hans Jordan and Reinhard Clerc June 22, 1928, various condensation products are obtained by condensation of meta-cresol and acetone, according to the conditions selected. At somewhat higher temperature but below 100° C, a polymerization product of the formula $C_{20}H_{24}O_2$ which contains but one hydroxyl group capable of acetylation is obtained. At a lower temperature a condensation product of the formula $C_{17}H_{20}O_2$ is produced containing in the molecule two hydroxyl groups capable of acetylation. These condensation products yield on splitting by thermal treatment 3-methyl-6-isopropylenephenol which can be hydrogenated by treating with hydrogen in the presence of a hydrogenation catalyst to menthol.

Methyl-isopropylene phenol exhibits, however, the tendency particularly on heating, to polymerize back whereby difficulties of manufacture tend to arise.

We have now found that this polymerization is avoided and the manufacture of menthol facilitated if the condensation products of meta-cresol and acetone described above are first acylated and then subjected to the thermal decomposition. The acylcompounds of 3-methyl-6-isopropylenphenol thus obtained show no tendency to polymerization, they can be transformed by treating with hydrogen in the presence of a hydrogenation catalyst into menthol-acylate and subsequently by saponifying into menthol.

The acylating of the condensation-product from meta-cresol and acetone is effected in the usual manner for example by boiling with acetic anhydride in the presence of sodium-acetate or sulphuric acid.

The following examples illustrate the invention:

Example 1

The monoacetylcompound of the condensation product from meta-cresol and acetone melting at 122°–123° C., which can be obtained by condensing meta-cresol and acetone at a temperature of 30–40° C. and acetylating then, is heated in a distillation vessel to about 300–320° C. A mixture of methyl-isopropylene-phenol-acetate and methyl-isopropylenephenol passes over. This mixture is then treated with hydrogen in the presence of a hydrogenating catalyst whereby 8 atoms of hydrogen per molecule are taken up. By saponification of the product which contains menthol and menthyl-acetate the latter is converted into menthol.

Example 2

The diacetylcompound of 4, 4'-dimethyl-2, 2'-dihydroxydiphenyldimethylmethane melting at 84–85° C. which can be obtained according to Example 1 of the application for patent of the U. S. Serial No. 287,639, from the 4, 4'-dimethyl-2, 2'-dihydroxydiphenyldimethylmethane obtainable from acetone and m-cresol by condensation under cooling in the presence of an acidic condensation agent, by acetylation with acetic acid and sodium acetate, is heated to about 310–330° C. The methyl-isopropylene-phenol-acetate obtained is hydrogenated in the presence of a hydrogenating catalyst until 8 atoms of hydrogen are taken up and then saponified to menthol.

Various changes may be made in the details disclosed in the foregoing specification without departing from the invention or sacrificing the advantages thereof.

We claim:—

1. The process of producing menthol comprising heating an acyl compound of a condensation product from meta-cresol and acetone and treating the acylcompound of 3-methyl-6-isopropylenephenol thus obtained with hydrogen in the presence of a hydrogenation catalyst until eight atoms of hydrogen have been taken up and subsequently saponifying the product.

2. The process of producing menthol comprising heating an acetylcompound of a condensation product from meta-cresol and acetone and treating the acetylcompound of 3-methyl-6-isopropylene-phenol thus obtained with hydrogen in the presence of a hydrogenation catalyst until eight atoms of hydrogen have been taken up and subsequently saponifying the product.

3. The process of producing menthol comprising heating the diacetylcompound of 4, 4'-dimethyl-2, 2'-dihydroxydiphenyldimethylmethane and treating the methylisopropylenephenolacetate thus obtained with hydrogen in the presence of a hydrogenation catalyst until eight atoms of hydrogen have been taken up and subsequently saponifying the product.

WALTER SCHOELLER.
HANS JORDAN.
REINHARD CLERC.